United States Patent Office 3,335,176
Patented Aug. 8, 1967

3,335,176
AMINOMETHYL CARBOXY DIBENZYL AMINES AND PREPARATION THEREOF
Edward W. Pietrusza, Morris Township, Morris County, and Richard E. Brown, Hanover, N.J., assignors to Allied Chemical Corporation, New York, N.Y., a corporation of New York
No Drawing. Filed Apr. 13, 1962, Ser. No. 187,194
5 Claims. (Cl. 260—518)

This invention relates to new monomers and the method of their preparation. More particularly it relates to monomers derived from phthalonitrile.

These new monomers can be homopolymerized or copolymerized with other monomers such as caprolactam for example, into high molecular weight compositions.

These monomers can readily be prepared from the phthalonitriles by first converting them into cyanobenzylamines, as for example, in accordance with the procedure described in copending application 809,906 filed April 30, 1959 or to the carboxyl amines which may for example be prepared in accordance with the procedure described in copending application Ser. No. 50,000 filed Aug. 16, 1960. These can then be converted to the secondary amines by simply heating the primary amines in the presence of a catalyst. The secondary amines can in turn be converted to a number of useful monomers.

The new monomers of this invention have the following structural formula.

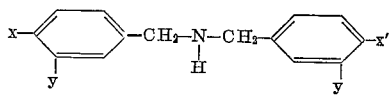

Wherein x and y are selected from the group consisting of hydrogen, carboxyl, and amino methyl; and x' and y' are selected from the group consisting of hydrogen and carboxyl, both members of one of the pairs x, x' and y, y' being hydrogen and neither member of the other said pair being hydrogen.

In the preparation of the secondary amine, the primary amine is heated in the presence of a catalyst e.g. at a temperature which permits refluxing. The catalysts which have been found to be suitable for this purpose include 5% palladium on carbon, Raney nickel, 5% Rh on carbon, and platinum dioxide. During the refluxing of the primary amines in the presence of the catalyst, a vigorous evolution of ammonia takes place and the secondary amine is formed. If the starting material is a cyanobenzylamine, heating in the presence of the catalyst will bring about the formation of a secondary amine dinitrile, which on partial hydrogenation, followed by hydrolysis, forms the aminomethyl carboxy dibenzyl amine; or on hydrolysis forms the dicarboxy dibenzyl amine. Another procedure for preparing the latter is to heat the benzylamine carboxy acid in the presence of a catalyst with evolution of ammonia.

The following examples are given to further illustrate the method of preparing the secondary amines and the monomers of this invention.

EXAMPLE A

*Preparation of 4,4'-dicyanodibenzyl amine*

40 parts by weight of 4-cyanobenzyl amine, about 176 parts by weight of xylene and 4 parts by weight of a 5% palladium on carbon catalyst were mixed under nitrogen and heated to reflux at a temperature of 135–140° C. for 4 hours. During this time a vigorous evolution of ammonia took place. The catalyst was removed from the resultant product by filtration and the xylene by distillation. The residue was then taken up in about 158 parts by weight of ispropanol. 23 parts by weight of product were obtained on cooling. The isopropanol solution was then evaporated to about ¼ its volume and on further cooling yielded an additional 7.6 parts by weight of product. The product obtained was a yellow crystalline solid having a melting point of 100–102° C. The yield was 82%. The remainder was found to be principally starting material along with some unknown by-products.

*Analysis.*—Calculated for $C_{16}H_{13}N_3$: titratable N= 5.67%. Found: 5.58%.

The equation for this reaction can be written as follows.

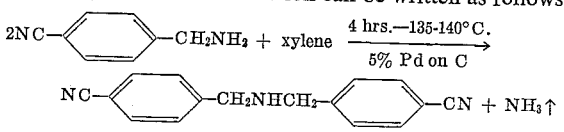

EXAMPLE B

*Preparation of 3,3'-dicyanodibenzylamine*

Employing essentially the same conditions as in Example A, 3-cyanobenzylamine was converted to 3,3'-dicyanodibenzylamine in a yield of 68% of theoretical. Assuming an empirical formula of $C_{16}H_{13}N_3$ for the product thereby obtained it was calculated that the titratable percentage of nitrogen present therein should be 5.67. Analysis revealed a value of 5.62.

The product of Examples A and B can be used in the preparation of the monomers in accordance with the following examples.

EXAMPLE I

*Preparation of 4,4'-dicarboxy dibenzylamine*

4,4'-dicarboxy dibenzylamine was prepared by refluxing a suspension of 24.7 parts by weight of 4,4'-dicyano dibenzylamine in a solution of 15 parts by weight of sodium hydroxide in 200 parts by weight of water. The mixture was heated to reflux for 5 hours at a temperature of 100–105° C. The resultant clear solution was cooled, filtered with decolorizing carbon, and treated with about 37 parts by weight of 12 N HCl. The slurry was cooled and filtered and the precipitate washed with water to give 27.65 parts by weight of pure white solid having a melting point of 304–6° C. The yield obtained was 97%. The equation for this reaction may be written as follows:

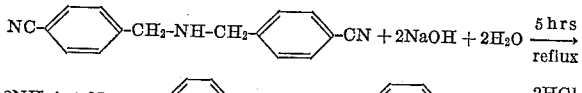

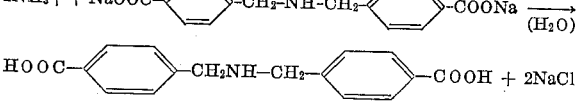

EXAMPLE II

*Preparation of 3,3'dicarboxy dibenzylamine*

3,3'dicarboxy dibenzylamine was prepared from 3,3'-dicyano dibenzylamine under the same reaction conditions given in the above example. It melted at 289–291° C. and was obtained in practically quantitative yields.

EXAMPLE III

*Preparation of 4-aminomethyl-4'-carboxy dibenzylamine*

The 4,4' dicyano dibenzylamine was used to prepare 4-aminomethyl-4'-carboxy dibenzylamine in the following manner:

A mixture of 4,4' dicyano dibenzylamine, 37.05 parts by weight, 200 parts acetic acid, and 3.0 parts 5% Pd on charcoal was reduced at 800 p.s.i. initial $H_2$ pressure and 45° C. until one-half the theoretical amount of hydrogen had been adsorbed (3 min.). The catalyst was filtered, the solvent removed by distillation, and the residue dissolved in water. Excess aqueous NaOH was added and the oily amine layer extracted with chloroform; the chloroform was then dried over $Na_2SO_4$ and removed by distillation and the amine was distilled. After removal of ca. 2.0 parts of a low-boiling forerun, the main fraction (25 parts) was taken off at ca. 210° C. at 0.4 mm. A non-distillable residue of 9.0 parts remained. By dissolving the main fraction in ca. 35 ml. of isopropanol and cooling to −15°, 5.6 parts of unreacted dinitrile was recovered by filtration.

The isopropanol was removed by distillation and the residue hydrolyzed by refluxing with excess aqueous $Ba(OH)_2$ until $NH_3$ evolution was complete. The clear hydrolyzate was cooled, treated with $CO_2$ for 3 hours, and the $BaCO_3$ filtered and washed. The clear filtrate was evaporated to dryness; the white residue was taken up in 15 parts water and about 60 parts by weight methanol was added. The solution was filtered and then treated with 79 parts isopropanol. On standing overnight, 8.0 parts of a white solid, M.P. 229–32° was obtained. Addition of excess isopropanol precipitated an oil which solidified on standing to give 5.1 parts additional product, M.P. 217–25°. Yield of crude product, 13.1 parts or 32% yield. After recrystallization from water-methanol-isopropanol the amino acid had a M.P. of 229–30° and gave the following analysis.

Calculated for $C_{16}H_{18}N_2O_2$: N, 10.35%. Found: N, 9.98.

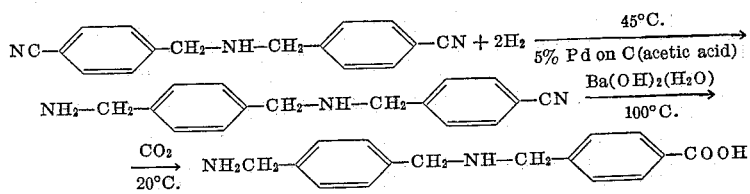

The equation for this reaction may be written as follows.

EXAMPLE IV

*Preparation of 3-aminomethyl-3′-carboxy dibenzyl amine*

3-aminomethyl-3′-carboxy dibenzyl amine may be prepared from 3,3′-dicyano dibenzyl amine under the same reaction conditions given in the above example.

EXAMPLE V

*Preparation of 4,4′-dicarboxy dibenzylamine*

4,4′-dicarboxy dibenzylamine was prepared by refluxing a mixture of 16.9 parts by weight of benzylamine-4-carboxylic acid monohydrate, 4 parts by weight of sodium hydroxide, 4 parts by weight of 5% palladium on charcoal and 150 parts by weight of water. The mixture was heated to reflux at a temperature of 100–105° C. for 12 hours. The catalyst was then removed by filtration and the filtrate treated with about 9.8 parts by weight of 12 N HCl. The resultant slurry was then cooled, filtered and washed by digesting in excess boiling water. The product was dried at 110° C. to give 8.9 parts by weight of a white powder having a melting point 305–306° C. The yield of product represented 63% of theoretical.

*Analysis.*—Calculated for $C_{16}H_{15}NO_4$: C, 67.40; H, 5.27; N, 4.91. Found: C, 67.32; H, 5.45; N, 4.93.

The equation for this reaction can be written as follows:

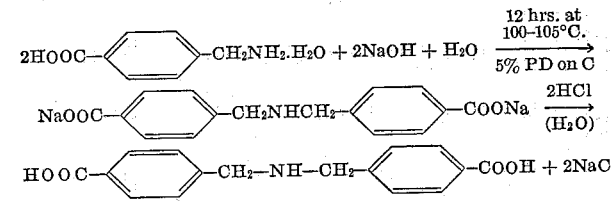

EXAMPLE VI

*Preparation of 3,3′-dicarboxy dibenzylamine*

3,3′-dicarboxy dibenzylamine was prepared from benzylamine-3-carboxylic acid monohydrate under the same conditions given in the above example. The product obtained had a melting point of 289–291° C. and the yield obtained was 65% of theoretical.

The following example illustrates the manner of using the monomers of this invention in the preparation of polymers.

EXAMPLE C

*Preparation of copolymers of ε-caprolactam and 4-amino methyl-4′-carboxy dibenzylamine*

ε-caprolactam and 4-aminomethyl-4′-carboxy dibenzylamine in controlled proportions were passed into a reactor along with 10% water. The reactor was then thoroughly flushed with oxygen-free nitrogen whereupon the charge was heated to between 210–250° C. (200–300 p.s.i. autogenous pressures) and maintained for about 3 hours with agitation. The temperature was then increased to between 245–290° C. and the water distilled for about 1 hour. Atmospheric pressures of nitrogen were then maintained over the melt at temperatures ranging between 275–290° C. for an additional 10 hours. The reactor was thereupon cooled to room temperature and the polymer removed and ground to a 5 to 20 mesh particle size, water washed and thoroughly dried at 50–75° C. at 1 to 10 mm. of pressure. The following results were obtained on samples containing 5%, 20% and 40% of the aminomethyl carboxy dibenzylamine.

| | | | |
|---|---|---|---|
| ε-Caprolactam (parts by weight) | 9.5 | 8.0 | 6.0 |
| 4′-aminomethyl dibenzylamine-4-carboxylic acid (parts by weight) | 0.5 | 2.0 | 4.0 |
| Water | 1 | 1 | 1 |
| Reduced viscosity | 0.97 | 0.98 | *0.48 |
| Melting point range, °C | 212–217 | 197–204 | 160–170 |

*Partially insoluble.

Reduced viscosities were determined in m-cresol solvent at 25° C. and 0.35–0.50 gm. per -00 ml. concentration, and were obtained by dividing the viscosity of the polymer solution by the viscosity of the solvent.

Copolymers of ε-caprolactam with 3′-amino methyl dibenzylamine-3-carboxylic acid may be prepared in the same manner as indicated in the above.

EXAMPLE D

*Bis-carboxydibenzylamine*

Bis-carboxylibenzylamine was prepared from benzylamine-4-carboxylic acid in 80% yield of theoretical in accordance with the procedure described in Example V. The product obtained was transformed to its acid chlorine and then polymerized interfacially with hexamethylene diamine. The product obtained was insoluble in common organic solvents, formic acid and sulfuric acid. No physical change was observed upon heating said polymer in a sealed tube at temperatures up to 360° C.

The polymerization procedure employed required the addition of 4,4′-dicarboxydibenzylamine (8 gms.) to $PCl_5$ (12 gms.) and $POCl_3$ (10 ml.). An immediate reaction occurred as evidenced by evolution of hydrogen chloride. The reaction mixture was then heated at reflux for 1.5 hours in a reaction flask fitted with a reflux condenser and a drying tube. At the end of this time a light brown colored solution was obtained. POCl₃ was removed therefrom under reduced pressure and the remaining viscous residue was poured into 150 ml. of ether. Precipitation of the product was induced by scratching the sides of the flask, whereupon a yellow powder was obtained. The powder was washed separately with ether and the pricipitate obtained was added to benzene (150 ml.) and the slurry thereby produced was poured into a Waring blender at 30° C. Hexamethylenediamine (15.5 gms.) and NaOH (3 gms.) in aqueous solution (200 ml.) were added rapidly. The mixture was stirred for 3 minutes and a precipitate that formed was isolated by filtration. Said precipitate was washed twice for 2 hour in boiling water (100 ml.) and then dried under reduced pressure at 100° C. The polyamide produced (7 gms.) did not melt or decompose when heated in a sealed tube at 360° C.

In like manner polyamides from the isomeric 3,3'-dicarboxydibenzylamine are prepared.

The polyamides produced by Examples C and D can be used to prepare films, coatings and fibers.

Although certain preferred embodiments of the invention have been disclosed for purpose of illustration, it will be evident that various changes and modifications may be made therein without departing from the scope and spirit of the invention.

We claim:
1. The method of preparing an aminoethyl carboxy dibenzyl amine wherein said aminomethyl and carboxy groups are either in the 3 and 3'-positions or in the 4 and 4'-positions which comprises heating a cyanobenzyl amine compound selected from the group consisting of 3-cyanobenzyl amine and 4-cyanobenzyl amine in the presence of an effective catalyzing amount of a member selected from the group consisting of palladium, nickel, rhodium, platinum and platinum dioxide with the evolution of ammonia to form a secondary amine dinitrile, hydrogenating the dinitrile so formed in the presence of a hydrogenation catalyst until one half of the theoretical amount of the hydrogen necessary to completely reduce the dinitrile has been absorbed thereby forming an aminomethyl cyanodibenzyl amine, hydrolyzing said cyanodibenzyl amine with an aqueous base and treating with acid to form the desired aminomethyl carboxydibenzyl amine.

2. The method of preparing 4-aminomethyl-4'-carboxy dibenzyl amine which comprises heating 4-cyanobenzyl amine in the presence of a Pd on C catalyst at a temperature of 135–140° C. with the evolution of ammonia to form a secondary amine dinitrile, hydrogenating the dinitrile so formed in the presence of a Pd on C catalyst at about 40°–50° C. until one-half of the theoretical amount of the hydrogen necessary to completely reduce the dinitrile has been absorbed thereby forming an aminomethyl cyanodibenzyl amine, hydrolyzing said cyanodibenzyl amine with aqueous barium hydroxide and treating with carbonic acid to form 4-aminomethyl-4'-carboxydibenzyl amine.

3. The method of preparing 3-aminomethyl-3'-carboxy dibenzyl amine which comprises heating 3-cyanobenzylamine in the presence of a Pd on C catalyst at a temperature of 135–140° C. with the evolution of ammonia to form a secondary amine dinitrile, hydrogenating the dinitrile so formed in the presence of a Pd on C catalyst at about 40°–50° C. until one-half of the theoretical amount of the hydrogen necessary to completely reduce the dinitrile has been absorbed thereby forming an aminomethyl cyanodibenzyl amine, hydrolyzing said cyanodibenzyl amine with aqueous barium hydroxide and treating with carbonic acid to form 3-aminomethyl-3'-carboxydibenzyl amine.

4. The compound 4-aminomethyl-4¹-carboxy dibenzyl amine.

5. The compound 3-aminomethyl-3'-carboxy dibenzyl amine.

References Cited
UNITED STATES PATENTS

| | | | |
|---|---|---|---|
| 2,831,831 | 4/1958 | Caldwell et al. | 260—78 |
| 2,944,079 | 7/1960 | Ross et al. | 260—518 |
| 2,997,463 | 8/1961 | Lum | 260—78 |
| 3,005,021 | 10/1961 | Miller | 260—518 |
| 3,036,047 | 5/1962 | Andres | 260—78 |
| 3,037,002 | 5/1962 | Pietrusza et al. | 260—78 |

FOREIGN PATENTS

| | | |
|---|---|---|
| 616,443 | 1/1949 | Great Britain. |
| 814,631 | 6/1959 | Great Britain. |
| 357,075 | 11/1961 | Switzerland. |

OTHER REFERENCES

Gilman: Organic Chemistry, vol. I, page 809 relied on.
Morrison et al., Organic Chemistry, 4th Ed. 2-1961, page 441 relied on.

LORRAINE A. WEINBERGER, *Primary Examiner.*

L. A. THAXTON, *Examiner.*